United States Patent Office

3,488,722
Patented Jan. 6, 1970

3,488,722
HIGH ALKALINITY LUBRICATING OIL ADDITIVES USING SULFONATE AND/OR CARBOXYLATE DISPERSANTS
Nylen L. Allphin, Jr., Pinole, Calif., assignor to Chevron Research Company, San Francisco, Calif., a corporation of Delaware
No Drawing. Continuation-in-part of applications Ser. No. 551,932, May 23, 1966, and Ser. No. 583,110, Sept. 29, 1966. This application Feb. 8, 1968, Ser. No. 703,890
Int. Cl. C10m 1/40, 1/24
U.S. Cl. 252—33       8 Claims

ABSTRACT OF THE DISCLOSURE

High alkalinity overbased organic sulfonates and carboxylates are prepared with a low methanol-clacium oxide mole ratio, wherein the methanol contains minor amounts of water, by initially carbonating a minor proportion of the calcium oxide, adding the organic dispersant and then continuing carbonation to completion.

CROSS REFERENCES TO RELATED APPLICATIONS

This application is a continuation-in-part of application Ser. No. 551,932, filed May 23, 1966, and application Ser. No. 583,110, filed Sept. 29, 1966, both now abandoned.

BACKGROUND OF THE INVENTION

Field of the invention

Dispersed alkaline earth metal carbonates, particularly barium carbonate and calcium carbonate, find wide use in lubricating oils. The overbased alkaline earth metal sulfonates and carboxylates are, in effect, calcium carbonate or barium carbonate dispersed by the dispersing agent in an organic medium. The insoluble character of the calcium carbonate and its polar nature create many problems in preparing a satisfactory overbased organic composition.

For the most part, the overbased organic sulfonates and carboxylates using calcium carbonate for overbasing have been the most popular. Since calcium has a lower atomic weight than barium, one can obtain a higher alkalinity value per unit weight of carbonate.

Calcium compounds are substantially insoluble in most organic solvents, even such polar solvents as methanol, and, therefore, there are numerous difficulties in obtaining a substantially homogenous dispersion of the calcium carbonate in the organic medium. The process begins with an insoluble solid, e.g., calcium oxide, usually in an inert medium such as a substantially hydrocarbon solvent and provides a dispersion of an insoluble calcium carbonate.

During the course of the reaction, it is found that the calcium compounds may gel the system, inhibiting further reaction with carbon dioxide and lowering the final base value. Alternatively, products having unacceptably high viscosities may be obtained. While viscosity may be reduced by treatment of the product with water, the more water that is required, the slower will be the filtration time, when the product is filtered to remove undispersed solids.

Other problems which are frequently encountered are insufficient incorporation of the calcium oxide as calcium carbonate, dropping out of calcium base values as solids and clogging of the filters by unsatisfactorily dispersed calcium compounds.

Improvements in the process must not result in creating other problems. Frequently, efforts to increase yield by reducing the volumes of the reaction mixture or increasing the ratio of calcium oxide to dispersant have created problems which have had deleterious effects so as to vitiate any resulting benefits.

Description of the prior art

U.S. Patent No. 3,155,616 discloses a process which precarbonates in the absence of dispersant, adds the dispersant and then continues the carbonation. Relatively high methanol calcium oxide ratios are employed. Other patents of interest are U.S. Patent Nos. 3,170,880, 3,170,-881, 3,262,880, 3,105,049, 3,152,991 and 3,223,630.

SUMMARY OF THE INVENTION

Highly overbased lubricating oil compositions are prepared having calcium carbonate dispersed with an organic sulfonate or carboxylate dispersing agent. The product provides high yields and is more economical than earlier processes by using low methanol to calcium oxide ratios, thus reducing the total volume of the reaction mixture and also reducing methanol losses.

Dehydrated lime is carbonated to from 10 to 50 percent of the theoretical amount of carbon dioxide required for total carbonation in the presence of a low mole ratio of methanol to lime and a hydrocarbonaceous diluent. An organic dispersant is then added to the partially carbonated mixture and the carbonation continued while allowing the temperature to rise to less than the boiling point of methanol. When no further carbon dioxide appears to be absorbed or, if the theoretical amount of carbon dioxide has been added, the product is then treated with water, filtered and distilled. The order in which filtration and distillation are performed is not significant.

DESCRIPTION OF THE PREFERRED EMBODIMENTS

The process may be broken down into four basic steps: (1) first carbonation; (2) second carbonation; (3) steam stripping; and finally (4) final treatment. These steps will be considered individually and the compositions used discussed as they are involved in the process.

In the first step, dehydrated lime, methanol and a hydrocarbonaceous diluent are mixed at ambient temperatures. Calcium oxide or dehydrated lime is obtained by roasting calcium carbonate, calcite, marble or limestone at temperatures upwards of 2,000° F. The resulting dehydrated lime is in a form in which it is readily dispersed and rapidly reacts with methanol.

The mole ratio of methanol to calcium oxide is not greater than 4:1, usually in the range of from about 2–4:1.

Commercial methanol is normally about 99.8 percent or higher, that is, the methanol usually has not more than 0.2 percent water. Preferably, the amount of water is increased to equal about 3 mole percent based on calcium oxide, but not greater than 75 mole percent based on calcium oxide. Most usually, the water present will be in the range of about 5 to 15 mole percent based on calcium oxide. The water will usually range from 0.2 to 5 weight percent of the methanol.

In addition to the methanol, a hydrocarbon diluent will also be present. As diluents, thinners or naphtha, e.g., Stoddard solvent, kerosene, aromatic naphtha, aliphatic thinners having from 0 to 20 percent of aromatic solvents, etc., find use.

The boiling point of the hydrocarbon diluent should be somewhat higher than methanol to permit its retention, when the methanol is being removed during the processing, and less than about 180° C., preferably less than about 150° C. When practical, the hydrocarbon used should form an azeotrope with water. The usual aromatic hydrocarbon diluents are of from 7 to 10 carbon atoms having boiling points in the range of about 100° to 180° C. These include toluene, xylene, cumene, cymene, etc. The preferred aromatic hydrocarbon is xylene. Aliphatic diluents will also be used having comparable boiling ranges.

The hydrocarbonaceous diluent is present in an amount to form about a 5 to 20 weight percent dispersion of calcium oxide in the diluent, usually in 8 to 15 weight percent dispersion.

After mixing the above materials, carbon dioxide is introduced until from about 10 to 50 percent, usually 20 to 40 percent of the theoretical amount of carbon dioxide has been added; the theoretical amount of carbon dioxide being 1 mole of $CO_2$ per mole of calcium oxide charged. The temperature initially (when carbonation is started) is in the range of about 15° to 20° C., ordinarily cooling is required. As the carbonation proceeds, the temperature generally rises, the temperature being kept below the boiling point of methanol, approximately 65° C. If desired, cooling may be applied so that the temperature does not exceed 45° C.

When the requisite amount of carbon dioxide has been introduced, the organic acid dispersant is added. As indcated previously, the organic dispersant is either an oil soluble organic sulfonate or carboxylate. The dispersants may be used individually or in combination.

The organic acid sulfonate has at least about 20 carbon atoms and usually from about 20 to 100 carbon atoms. The preferred dispersants are oil soluble sulfonates, particularly the petroleum sulfonates commonly called "mahogany sulfonates." Other sulfonates which may be used include the alkyl naphthylene sulfonates, such as dinonyl naphthylene sulfonate and the alkyl benzene sulfonates of upwards of 20 carbon atoms.

The alkyl benzene sulfonates are generally made by alkylation of benzene with olefins such as polypropylene, and polybutylene, followed by sulfonation of the aromatic ring. Alkylates of benzene or naphthylene with olefins derived from other sources, e.g., thermal cracking of paraffin wax, can also be sulfonated and employed as dispersants.

Usually, there will be from 0.5 to 3 parts of a hydrocarbonaceous oil of lubricating viscosity per part of organic sulfonate, more usually from about 1 to 2 parts of oil per part of organic sulfonate. The oil will usually be high boiling and be retained, for the most part, in the final product. Oils of lubricating viscosity are generally of a viscosity in the range of 35 to 50,000 SUS at 100° F. and are paraffinic, naphthenic, asphaltic or mixed base oils. Synthetic hydrocarbon oils may also be employed.

The carboxylate which is added is substantially oil soluble, both as the acid form and as the alkaline earth metal salt. That is, the carboxylic acids have at least about 12 carbon atoms and usually not more than 200 carbon atoms, for the most part, having from about 12 to 100 carbon atoms. The carboxylic acids may be mono- or dibasic and will have equivalent weights of at least about 200 and generally not more than 800, more usually from about 200 to 525. (By hydrocarbyl is intended an organic radical composed solely of carbon and hydrogen which may be aliphatic, alicyclic or aromatic or combinations thereof. The radical may be saturated or aliphatically unsaturated, e.g., olefinic.)

Usually, the carboxylic acids will be aliphatic carboxylic acids or alicyclic carboxylic acids, that is, carboxylic acids free of aromatic unsaturation. From 0 to 3 sites of aliphatic unsaturation may be present, more usually from 0 to 1 site of aliphatic unsaturation, generally olefinic unsaturation.

The acids used may be synthetic or naturally occurring. Moreover, they may be used individually or as mixtures.

Various acids which find use either by themselves or in combination with others are oleic acid, naphthenic acid, stearic acid, palmitic acid, enanthic acid, arachidic acid, behenic acid, polyisobutenyl succinic acid, polypropylene succinic acid, tetrapropenylbenzoic acid, chaulmoogric acid, etc.

Although the dispersants may be employed in the form of free acids which are subsequently neutralized by the calcium oxide employed in the process, it is preferred to employ the dispersants in the form of their soaps with alkaline earth metals, preferably calcium, although barium may also be used. References to sulfonate or carboxylate will generally apply to the analogous acid as well.

When a combination of organic sulfonate and carboxylate is used, there will usually be from about 20 to 80 weight percent of the sulfonate and, respectively, from 80 to 20 weight percent of the carboxylate, more usually 30–70:70–30 weight percent.

The amount of the dispersant charged is based on the calcium oxide charged: a ratio of 1 mole of dispersant to greater than about 5 moles of calcium oxide and usually less than about 30 moles of calcium oxide is employed. More usually, about 1 mole of dispersant will be charged to from about 5 to 20 moles of calcium oxide which has been charged. With the carboxylate alone, the mole ratio of calcium oxide to carboxylate will generally be in the range of 5 to 10.

Conveniently, the dispersant is charged as a moderately concentrated solution. The diluent or solvent will generally be a hydrocarbonaceous diluent, either a single compound or a mixture of compounds. Frequently, the same diluent used with the methanol will also be used with the dispersant. However, as already indicated, sulfonates are frequently supplied as relatively concentrated solutions in paraffinic oils. To that extent, the sulfonate in the paraffinic oil may be further diluted with a hydrocarbon diluent and added to the partially carbonated dispersion in that form.

The concentration of the dispersant in the hydrocarbon diluent will depend to a great degree on the initial amount of diluent present. Generally, the total amount of hydrocarbon diluent employed in the reaction mixture, including oils and paraffinic or aromatic low boiling solvents will be from about 8–20:1 weight ratio based on dispersant, more usually from about 10–15:1 weight ratio based on dispersant. The high boiling oil, which usually accompanies the sulfonate and may also be present with the carboxylate, will be in the range of about .8–2:1 weight ratio based on dispersant and more usually in the range of about 1–1.5:1. The high boiling hydrocarbon will generally be oils of lubricating viscosity.

The percent of the total diluent used in the first carbonation will be in the range of about 50 to 95 weight percent, more usually 65 to 85 weight percent. Correspondingly, the hydrocarbon diluent added with the sulfonate will range from about 5 to 50 weight percent, more usually 15 to 35 weight percent.

After the addition of the dispersant, the carbonation is continued and the temperature allowed to rise, again not to exceed the boiling point of methanol (approximately 65° C.), preferably to 45° C. When the theoretical amount of carbon dioxide has been introduced or no further carbon dioxide seems to be absorbed, the temperature is allowed to rise to above the boiling point of methanol (approximately 70° C.) and the methanol distilled off. This temperature is maintained until no more methanol appears to be coming over. Generally, this is a matter of some minutes, usually not exceeding 30 minutes. Alternatively, the small amount of methanol present can be removed during the steam stripping. If gelation begins, water should be added to prevent excessive gelation.

The next step in the process was referred to as steam stripping. Possibly it would be better to describe the procedure as treating the reaction mixture with water near or above the boiling point of water; that is, greater than 85° C. For steam stripping, steam is bubbled through the reaction mixture at a convenient rate. The temperature of the reaction mixture is maintained at least at 80° C. and usually at least 90° C. to prevent the accumulation of water. Alternatively, superheated steam may be used and external heating partially or completely avoided.

The steam stripping is carried out usually for at least about 5 minutes and generally not more than 45 minutes, more usually in the range of about 10 to 30 minutes. Some of the low boiling solvent is carried over with the steam. The hydrocarbon solvent is readily separated from the water and can be dried to the extent necessary and re-used.

Alternatively, water may be added and then driven off by heating the mixture to a temperature at which the water boils off, either by itself or as an azeotrope with the solvent. In essence, one is forming steam in situ rather than from an outside generator which introduces the water directly as steam. The amount of water will usually vary from about 10 to 50 volume percent of the reaction mixture, more usually from about 20 to 40 volume percent.

After the water treatment or steam stripping has been terminated, any low boiling solvents are removed by distilling, generally at atmospheric pressure, but, if convenient, in vacuo. The distillation temperatures generally do not exceed 225° C. and usually will not exceed about 200° C., more usually not exceeding 150° C.

However, it may be convenient to filter the reaction mixture prior to the distillation. While the solvent is present, the viscosity of the mixture will be lower and therefore the mixture will be more easily filtered. However, prior to distillation, a much greater volume must be filtered and, therefore, these two considerations are weighed in relation to the available equipment. Filtration and clarification of the composition are most conveniently accomplished by mixing with a suitable filter aid such as diatomaceous earth. Various earths are commercially available under such names as "Filtercel," "Dicalite," "Supercel" and "Hyflo."

At the end of the carbonation, depending upon how much hydrocarbonaceous oil has been added during the course of the reaction, a supplemental amount of oil may be added. The amount of oil added will also depend on the desired calcium concentration or alkalinity value. Usually, the amount of oil present after carbonation will be at least about 0.75 part per part of calcium oxide charged and generally equal to about 0.8 to 3 parts per part of calcium oxide charged. Of course, larger amounts of oil may be charged to obtain lower concentrations of calcium.

EXAMPLES

The following examples are offered by way of illustration and not by way of limitation and serve to further illustrate the process of this invention.

Example I

Into a reaction vessel was introduced 62 ml. of methanol, 240 ml. of xylene, 0.5 ml. of water and 25.7 g. of calcium oxide (Colton lime, technical grade), the mixture cooled to 58° F. and carbon dioxide introduced at a relatively rapid rate until approximately 30 percent of theoretical was added. Rapid mixing was maintained during the carbon dioxide addition. At the end of this time, 41 ml. of a 40 weight percent solution of neutral calcium mahogany sulfonate in 130 neutral oil was diluted with 41 ml. of xylene; this mxture was added to the partially carbonated calcium oxide mixture and the carbonation continued until the theoretical amount of carbon dioxide was added. The time for the addition of calcium dioxide from beginning to end was about 19 minutes. The temperature at the end of the carbon dioxide addition was 55.5° C. One hundred ml. of water was added and the mixture heated to boiling, the temperature being continually raised until about 400° F. was reached. The temperature was maintained until no further xylene appeared to come over.

The product was then filtered providing 25 g. of a clear product. Potentiometric titration using perchloric acid gave an alkalinity value of 330 mg. KOH/g.

Example II

Into a reaction vessel was introduced 62 ml. of methanol, 240 ml. of xylene and 5 ml. of water, followed by the addition of 25.7 g. of calcium oxide (Colton lime, technical grade), and the mixture cooled to 56° F. Carbon dioxide was then introduced until 25 percent of theoretical had been added. The temperature rose to 34° C.

To this mixture was then added a solution comprising 41 ml. of a 40 weight percent solution of calcium mahogany sulfonate in 130 neutral oil diluted with 41 ml. of xylene and carbonation continued. The carbonation required a total of 13 minutes. The temperature had by then risen to 50° C. To the mixture was added 100 ml. of water and the temperature slowly raised to 400° F. and held there until xylene no longer continued to come over. The residue was diluted with 25 g. of a 130 neutral oil and then filtered through diatomaceous earth. The alkalinity value of a sample of the product was 264 mg. KOH/g.

Example III

Into a reaction vessel was introduced 40 ml. of methanol, 150 ml. of xylene, 5 ml. of water and 25.7 g. of calcium oxide and the mixture cooled to 45° F. Carbonation was begun and carried out to 30 percent of theoretical. The temperature rose to about 34° C. To this mixture was then added a solution of 41 ml. of a 40 weight percent calcium mahogany sulfonate in 130 neutral oil in 41 ml. of xylene and carbonation continued until the theoretical amount had been introduced. By that time, the temperature had risen to 58° C. Steam stripping was then begun by rapidly passing steam through the mixture for about 15 minutes, the temperature was then raised to 400° F. and the xylene distilled over. To the residue was added 80 g. of oil and the product filtered. The alkalinity value determined was 292 mg. KOH/g.

Example IV

Into a reaction vessel was introduced 491 ml. of an aliphatic thinner (boiling range 130° to 150° C.; 6 percent aromatics), 43 ml. of methanol (0.5 percent water) and 30 g. of calcium oxide. The mixture was stirred and carbon dioxide added until the temperature rose from an initial temperature of 23° to a temperature of 33.5° C. At this time a solution containing 119 g. of a 40 weight percent calcium mahogany sulfonate in 130 neutral oil in 119 ml. of the above described thinner was added while carbonation was continued. When the temperature reached 53.5° C., 23 g. of carbon dioxide had been taken up and carbonation was discontinued.

The temperature was then slowly raised to a final temperature of 136° C. while taking off methanol and solvent overhead. The mixture was then allowed to cool, there being no gel formation. When the temperature had dropped to 93° C., 18 cc. of water were added and the temperature slowly raised to 139° C.

The mixture was then filtered, filtering in 45 seconds. The filter cake was washed with 100 cc. of the above indicated thinner and combined with the filtered product and the solvent stripped. The alkalinity value determined was 287 mg. KOH/g.

Example V

Into a reaction vessel was introduced 419 ml. of an aliphatic thinner (see Example IV), 43 ml. of methanol (0.5 percent water) and 30 g. of calcium oxide. Carbonation was begun and continued until the temperature had risen from an initial temperature of 22° C. to a temperature of 33° C.

To the reaction mixture was then added 101 g. of a 40 weight percent solution of a synthetic alkylated benzene sulfonate in 130 neutral oil dissolved in 119 ml. of the above indicated aliphatic thinner. Carbonation was continued until the temperature had risen to 54° C. At this time, 20.2 g. of carbon dioxide had been taken up.

Carbonation was discontinued and the temperature raised to a final temperature of 135° C. while methanol and solvent were taken overhead. The reaction mixture was then allowed to cool to 95° C. at which time 18 cc. of water was added. The temperature was then raised to 138° C. while taking water and solvent overhead. The product filtered rapidly over a period of 18 seconds, providing 158 g. of product. The alkalinity value determined was 288 mg. KOH/g.

Example VI

Into a reaction vessel was introduced 240 cc. of xylene, 62 cc. of methanol, 0.5 cc. of water and 25.7 g. of calcium oxide (Colton lime technical grade, 95 percent CaO) and the mixture cooled to 40° F. Carbon dioxide was then introduced by bubbling it into the reaction mixture at a relatively rapid rate until approximately 30 percent of the theoretical amount had been added. The temperature rose to 34° C.

To the partially carbonated mixture was then added a mixture of 25 cc. of a 40 weight percent solution of neutral calcium mahogany sulfonate (approximately 1,100 molecular weight) in 130 neutral oil, 15 cc. of oleic acid and 42 cc. of xylene. Carbonation was then continued until the theoretical amount of carbon dioxide had been added, the temperature rising to 58° C. The temperature was then slowly raised to 110° C., while taking methanol overhead. When no further methanol was distilled, steam was introduced for a period of 10 minutes, while maintaining a temperature of the mixture of about 120° C.

The mixture was then filtered using a diatomaceous earth filter aid, filtering very easily. Volatiles were then removed by heating the mixture to 200° C., and taking volatile material overhead, followed by the addition of 20 g. of a 130 neutral oil.

Potentiometric titration using perchloric acid gave an alkalinity value of 381, 382 mg. KOH/g. This indicates a percent of basic calcium of 13.5.

The above procedure was repeated, except for variation in the dispersant composition used. Other minor variations were also made which are indicated in the following table.

the low volume of methanol employed. Excellent detergency is obtained when the compositions are used in diesel engines.

The carboxylate compositions have the further advantage over sulfonates in that all the calcium present will react with strong mineral acids. That is, the calcium carboxylate, as well as the calcium carbonate, may be used for neutralization of strong mineral acids. Also, the use of the carboxylates either by themselves or in combination with sulfonates achieves greater oil solubility.

As will be evident to those skilled in the art, various modifications on this invention can be made or followed, in the light of the foregoing disclosure and discussion, without departing from the spirit or scope of the disclosure or from the scope of the following claims.

I claim:

1. In a method for preparing dispersions of calcium carbonate in a hydrocarbonaceous media which comprises combining calcium oxide with methanol in a hydrocarbonaceous reaction medium, wherein said medium will comprise 50 to 95 weight percent of an aliphatic thinner, boiling in the range of about 100° to 180° C. and from 5 to 50 weight percent of a hydrocarbon oil of lubricating viscosity, wherein the amount of the lubricating oil is in a weight ratio of 0.8–2:1 to the organic dispersant, adding carbon dioxide in from 10 to 50 percent of the amount stoichiometrically required to convert the oxide to carbonate, introducing an organic dispersant which is an organic acid sulfonate having at least about 20 carbon atoms or a carboxylate of from about 12 to 200 carbon atoms or a combination thereof, and continuing the carbon dioxide addition until the desired amount has been added or carbon dioxide is no longer absorbed, treating with water at a temperature sufficient to vaporize the water and removing substantially all the water, the improvement which comprises combining the calcium oxide and methanol at a mole ratio of 1:2–4 wherein water is present in at least 3 mole percent based on calcium oxide and not greater than 75 mole percent based on calcium oxide, and the total dispersant is present in an amount so as to have at least 5 moles of calcium oxide per mole of dispersant.

2. A method according to claim 1, wherein said treating with water comprises steam stripping.

3. A method according to claim 1, wherein after treatment with water, the resulting mixture is filtered.

4. A method according to claim 1, wherein said water is present in from 5 to 15 mole percent based on cal-

TABLE I

| | Dispersant Composition Added | | Xylene, cc. | Alkalinity value | Percent Ca [2] |
|---|---|---|---|---|---|
| | Ca Mahogany [1] Sulfonate, cc. | Carboxylic Acid, cc. | | | |
| Example [a]: | | | | | |
| VII | 25 | Alkenyl succinic [3] acid, 15 | 42 | 342, 334 | 11.95 |
| VIII | | Oleic acid, 50 | 32 | 319, 316 | 11.3 |
| IX | 25 | Naphthenic acid,[4] 32 | 25 | 341, 341 | 12.05 |
| X | 31 | Naphthenic acid,[4] 20 | 31 | 414, 416 | 14.6 |
| XI | 23 | Naphthenic acid,[4] 20 | 42.5 | 342, 341 | 12.05 |
| XII | | C₁₈ saturated [5] fatty acid, 40 | 42 | 349, 353 | 12.4 |

[1] Same sulfonate oil composition as used in Example VI.
[2] Determined from alkalinity value.
[3] Polyisobutylene succinic acid (approx. 1,000 mol. wt.): 50 wt. percent in Mid-Continent 100 neutral oil.
[4] A fraction obtained from caustic treatment of distillate fuels.
[5] This is prepared by clay isomerization of linoleic-linolenic acids (which also produces dimer and trimer acids), followed by hydrogenation and dewaxing of the C₁₈ acids.
[a] The amount of 130 neutral oil added at the end of the preparation, when 20 g. of 130 neutral oil was added in Ex. VI is as follows: VII, 20 g.; VIII, 26 g.; IX, 0; X, 15 cc.; XI, 25 cc.; XII, 25 g.
In Examples X and XI, 100 cc. of water was added in place of introducing steam, and the mixture heated to boiling, driving off the water.

The calcium carbonate dispersions were clear, readily filtered and could be mixed with a wide variety of different oils to provide stable dispersions of the calcium carbonate with high alkalinity reserve. Little, if any, gelation was encountered. Moreover, high ratios of calcium carbonate to calcium sulfonate and calcium carboxylate were obtained with almost total utilization of the calcium oxide charged. Significant economics were achieved by cium oxide and the mole ratio of calcium oxide to dispersant is 8–30:1.

5. A method according to claim 1, wherein said organic dispersant is an organic acid sulfonate of from about 20 to 100 carbon atoms.

6. A method according to claim 1, wherein said dispersant is a carboxylate of from 12 to 200 carbon atoms having from 1 to 2 carboxylic acid groups.

7. A method according to claim 1, wherein said dispersant is a combination of an organic acid sulfonate and a carboxylate.

8. A method according to claim 1, wherein said organic acid dispersant is a combination of organic acid sulfonate and naphthenic acid.

References Cited

UNITED STATES PATENTS

| | | | |
|---|---|---|---|
| 3,105,049 | 9/1963 | Voorhees | 252—33 |
| 3,155,616 | 11/1964 | Voorhees | 252—33 |
| 3,170,880 | 2/1965 | Voorhees | 252—18 XR |
| 3,170,881 | 2/1965 | Voorhees | 252—33 XR |
| 3,262,880 | 7/1966 | Voorhees | 252—33 |

PATRICK P. GARVIN, Primary Examiner

I. VAUGHN, Assistant Examiner

U.S. Cl. X.R.

252—33, 2, 39, 18